Aug. 16, 1932.   B. H. FLYNN   1,871,975
TRANSMISSION MECHANISM
Original Filed June 13, 1930

Inventor
B. H. Flynn

Patented Aug. 16, 1932

1,871,975

UNITED STATES PATENT OFFICE

BENJAMIN H. FLYNN, OF ALEXANDRIA, LOUISIANA

TRANSMISSION MECHANISM

Original application filed June 13, 1930, Serial No. 460,916. Divided and this application filed June 5, 1931.
Serial No. 542,431.

This application is a division of my parent U. S. application Serial No. 460,916, filed June 13, 1930, disclosing a concrete pavement covering and uncovering machine embodying two conveyors for dragging earth inwardly onto a pavement to keep the latter moist while curing, and for later dragging the earth from the cured pavement. In such a machine, it is highly desirable that provision be made for driving the conveyors in a number of different ways, allowing earth to be pulled inwardly from opposite sides of the road, or only from one side, allowing the earth to be dragged from the center of the pavement to both sides of the latter or dragged entirely across the pavement and discharged only at one side, etc. The principal aim of the present invention has been to provide a unique and advantageous transmission mechanism for driving the above mentioned conveyors in any required directions, but said invention is not restricted to this particular field of use.

In the accompanying drawing, a preferred construction has been shown and will be specifically described, with the understanding however, that variations may be made within the scope of the invention as claimed.

Figure 1:
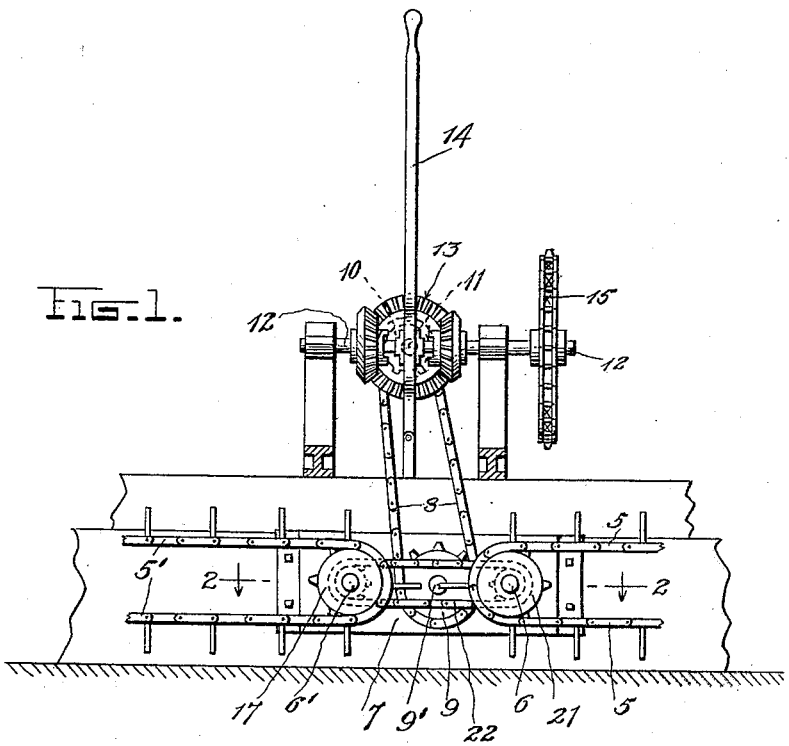
Fig. 1 is a fragmentary elevation partly in section showing the transmission mechanism operatively associated with the above mentioned conveyors.

On the drawing, the two conveyors are denoted at 5 and 5' respectively, said conveyors being provided with drive shafts 6 and 6' which extend into a lubricant-containing casing 7 suitably mounted upon the machine. This casing contains a number of the transmission parts hereinafter mentioned, said parts being driven by a chain 8 and sprockets 9 and 10 from an overhead shaft 11. This shaft 11 may be driven in either direction by means of another shaft 12 and a suitable reverse gear 13 controlled by a lever 14. Sprocket 15 on shaft 12 is merely a part of appropriate means for driving said shaft.

Figure 2:
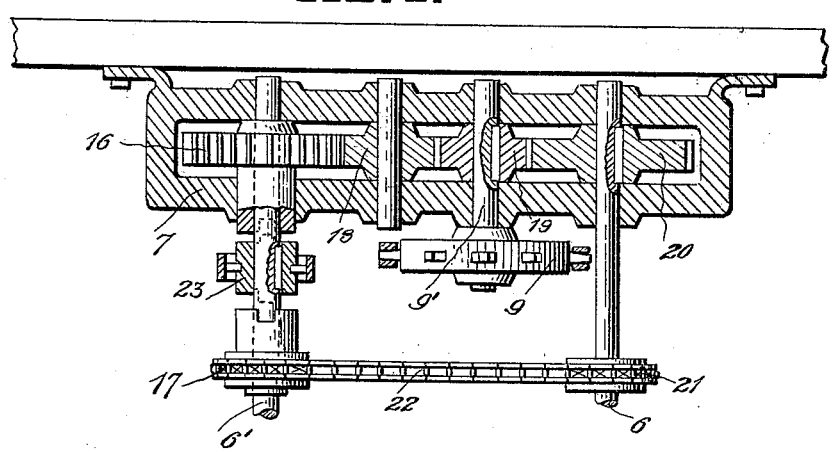
Fig. 2 is an enlarged horizontal sectional view on line 2—2 of Fig. 1.

Loose upon the shaft 6', are a spur gear 16 and a sprocket 17, the former being within the casing 7 and the latter at the exterior thereof. Gear 16 meshes with an idler 18 mounted in the casing 7 and driven by a pinion 19 also disposed in said casing, said pinion 19 being secured upon a shaft 9' to which the sprocket 9 is secured. Pinion 19 meshes with a gear 20 secured upon the shaft 6, said gear being within the casing 7. A sprocket 21 is also secured upon the shaft 6 at the exterior of the casing 7, and a chain 22 connects this sprocket with the sprocket 17. A shiftable clutch 23 controllable by a lever 24, is provided for connecting either the gear 16 or the sprocket 17 with the shaft 6'. It will be seen that gear 16 always travels oppositely from gear 20, whereas sprocket 17 always travels in the same direction as shaft 6 on which gear 20 is secured. Consequently, when clutch 23 is engaged with sprocket 17, both shafts 6 and 6' will be driven in the same direction. However, when clutch 23 is engaged with gear 16, the two shafts 6 and 6' will be driven in opposite directions. When clutch 23 is in the neutral position shown in Fig. 2, shaft 6 will be driven but shaft 6' will remain idle. Regardless of the position occupied by the clutch 23, the pinion 19 may be driven in either direction, due to the reversible driving means above described for the shaft 9' which carries said pinion. The lever 14 controls the direction in which the shaft 6 is to be driven, and the position of the clutch 23 determines whether shaft 6' will be driven at all, will be driven in the same direction as the shaft 6, or will be driven reversely from said shaft 6. Hence, by the simple structure disclosed, I am enabled to drive the conveyors 5 and 5' to best advantage, according to requirements.

While the general structure herein disclosed may be followed if desired, attention is again invited to the fact that within the scope of the invention as claimed, variations may be made.

I claim:

In combination, two parallel rotatable shafts, two wheels loose upon one of said shafts, reversible driving means for driving the other shaft in either direction and for driving one of said loose wheels oppositely from said other shaft, driving connections between said other shaft and the other of said loose wheels for driving the latter unidirectionally with the former, and clutch means for connecting either of said loose wheels with said one shaft.

In testimony whereof, I affix my signature.

BENJAMIN H. FLYNN.